United States Patent
Saito et al.

(10) Patent No.: US 7,898,945 B2
(45) Date of Patent: Mar. 1, 2011

(54) SYSTEM, APPARATUS, AND METHOD FOR MULTIMEDIA TRANSMISSION

(75) Inventors: Masayuki Saito, Matsumoto (JP); Masahiko Tange, Kyoto (JP); Akio Yamamoto, Hamamatsu (JP)

(73) Assignee: Roland Corporation, Hamamatsu, Shizuoka-ken (JP)

( * ) Notice: Subject to any disclaimer, the term of this patent is extended or adjusted under 35 U.S.C. 154(b) by 1099 days.

(21) Appl. No.: 11/646,180

(22) Filed: Dec. 26, 2006

(65) Prior Publication Data
US 2008/0151925 A1 Jun. 26, 2008

(51) Int. Cl.
*G01R 31/08* (2006.01)
(52) U.S. Cl. ........................................... 370/225
(58) Field of Classification Search .................. 370/241, 370/216, 535
See application file for complete search history.

(56) References Cited

U.S. PATENT DOCUMENTS

| | | | |
|---|---|---|---|
| 4,922,536 A | 5/1990 | Hoque | |
| 6,411,598 B1* | 6/2002 | McGlade | 370/217 |
| 2003/0039207 A1* | 2/2003 | Maeda et al. | 370/216 |
| 2007/0097858 A1* | 5/2007 | Lesartre et al. | 370/228 |
| 2007/0171814 A1* | 7/2007 | Florit et al. | 370/216 |
| 2009/0092044 A1* | 4/2009 | Saito | 370/228 |

* cited by examiner

*Primary Examiner* — Kevin C Harper
(74) *Attorney, Agent, or Firm* — Foley & Lardner LLP

(57) ABSTRACT

A multimedia transmission system with redundant multiple strain transmission lines for transmitting packeted multimedia data that includes sound and/or video comprises an apparatus having send and receive function capabilities. The apparatus includes a carrier detection device adapted to detect a carrier related to that packeted multimedia data. A switch device is adapted to change over to a selected sending and/or receiving capable transmission line from among the redundant multiple strain transmission lines based on the carrier detection by the carrier detection device.

22 Claims, 9 Drawing Sheets

SYSTEM, APPARATUS, AND METHOD FOR MULTIMEDIA TRANSMISSION

BACKGROUND OF THE INVENTION

This invention relates generally to multimedia transmission. Specifically, embodiments of the invention relate systems, apparatuses and methods of multimedia transmission using redundant multiple transmission lines that shorten the changeover time.

On stage or outdoors, there are transmission methods for moving large amounts of sound signals over long intervals, such as those presented in U.S. Pat. No. 4,922,536 (the "'536 patent"), for example. In the '536 patent, a transmission line moves large amounts of multiplexer (MUX) units to on-stage. Multiple microphones are connected to each MUX unit and stored. The input sounds from multiple microphones have numerous MUX units, and these numerous sound signals are transmitted to the control booth, which is separated from the stage, via the transmission line. Alternatively, the processed sound signal from the control booth is transmitted to a demultiplexer (DEMUX) unit placed on the side of the stage via the transmission line. The processed sound signal is categorized in the DEMUX unit and output through the monitor and speakers.

SUMMARY OF THE INVENTION

In order to solve problem points in conventional systems, embodiments of the present invention provide multimedia transmission systems, multimedia apparatuses, and changeover methods for the transmission line for the purpose of a multimedia transmission in which the time necessary for fault detection and transmission line changeover may be reduced.

In one aspect of the invention, a multimedia transmission system with redundant multiple strain transmission lines for transmitting packeted multimedia data that includes sound and/or video comprises an apparatus having send and receive function capabilities. The apparatus includes a carrier detection device adapted to detect a carrier related to that packeted multimedia data. A switch device is adapted to change over to a selected sending and/or receiving capable transmission line from among the redundant multiple strain transmission lines based on the carrier detection by the carrier detection device.

In a particular embodiment, the apparatus further includes a first data output device adapted to output the packeted multimedia data to an opposition apparatus using one of the transmission lines from among the redundant multiple strain transmission lines. When the carrier cannot be detected in a set time by the carrier detection device, the transmission line changes over to a separate transmission line for the output of the packeted multimedia data from the first data output device.

In one embodiment, the apparatus further comprises a second data output device adapted to output the packeted multimedia data to the opposition apparatus using at least two strains of transmission lines from among the redundant multiple strain transmission lines when the carrier detection device is unable to detect a carrier from all of the redundant multiple strain transmission lines, until a corresponding carrier is detected.

In one embodiment, the apparatus further comprises a third data output device adapted to output the packeted multimedia data to the opposition apparatus using at least two strains of transmission lines from among the redundant multiple strain transmission lines. The switch device changes over to the selected receiving capable transmission line from among the redundant multiple strain transmission lines based on carrier detection from the carrier detection device.

In one embodiment, the apparatus further comprises a loop confirmation device adapted to confirm whether or not the corresponding output packet has looped and returned after the packeted multimedia data is output from the third data output device, and a fourth data output device adapted to output the packeted multimedia data to the opposition apparatus using one of the transmission lines from among the redundant multiple strain transmission lines when it is confirmed from the loop confirmation device that the output packet has returned.

In one embodiment, the system further comprises one or more apparatuses that have receiving capabilities configured with redundant multiple strain transmission lines between the one or more apparatuses that have receiving capabilities and the apparatus that has send and receive function capabilities. The apparatus that has receiving capabilities may include a carrier detection device adapted to detect a carrier related to packeted multimedia data in the receipt of the packeted multimedia data, and a switch device adapted to change over to the selected receiving capable transmission line based on the detection of the carrier according to the carrier detection device from among the redundant multiple strain transmission line.

In another aspect of the invention, an apparatus is provided for use in a multimedia transmission system for transmitting packeted multimedia data that includes sound and/or video. The apparatus has at least receiving capabilities and comprises a carrier detection device adapted to detect, in the receipt of the packeted multimedia data, a carrier related to the packeted multimedia data, and a switch device adapted to change over to a selected sending and/or receiving capable transmission line from among the redundant multiple strain transmission lines configured between the apparatus and an opposition apparatus based on the carrier detection from the carrier detection device.

In one embodiment, the apparatus has send and receive function capabilities and further comprises a first data output device adapted to output the packeted multimedia data to the opposition apparatus using one of the transmission lines from among the redundant multiple strain transmission lines. When the carrier cannot be detected in the set time from the carrier detection device, the switch device changes over to a separate transmission line from among the sending and/or receiving capable transmission lines to output the packeted multimedia data from the first data output device based on the carrier detection by the carrier detection device.

In one embodiment, the apparatus further comprises a second data output device adapted to output the packeted multimedia data to the opposition apparatus using at least two strains of transmission lines from among the redundant multiple strain transmission lines when the carrier detection device is unable to detect a carrier from all of the redundant multiple strain transmission lines until the corresponding carrier is detected.

In one embodiment, the apparatus further comprises a third data output device adapted to output the packeted multimedia data to the opposition apparatus using at least two strains of transmission lines from among the redundant multiple strain transmission line.

In one embodiment, when the packeted multimedia data is received from the opposition apparatus, the switch device changes over to the receiving capable transmission line selected based on the carrier detection by the carrier detection device from within the redundant multiple strain transmission line.

In one embodiment, the apparatus further comprises a loop confirmation device adapted to confirm whether or not a corresponding output packet has looped and returned after the packeted multimedia data is output from the third data output device, and a fourth data output device adapted to output the packeted multimedia data to the opposition apparatus using one of the transmission lines from among the redundant multiple strain transmission lines when it is confirmed from the loop confirmation device that the output packet has returned.

In another aspect, the invention includes a multiple strain transmission changeover method. The method comprises transmitting packeted multimedia data that includes sound and/or video in a multimedia transmission system having multiple strain transmission lines; detecting a carrier related to the packeted multimedia data in the receipt of the packeted multimedia data by an apparatus having send and receive function capabilities; and changing over to a selected sending and/or receiving capable transmission line from among the redundant multiple strain transmission lines based on the carrier detection.

In one embodiment, the method further comprises outputting, in a first output step, the packeted multimedia data to an opposition apparatus using one of the transmission lines from among the redundant multiple strain transmission lines. When the carrier is not detected in the set time in the detecting step, the opposition apparatus changes over to a separate transmission line that is a sending and/or receiving capable transmission line, to output the packeted multimedia data from the data output device based on the carrier detection.

In one embodiment, the method further comprises outputting, in a second output step, the packeted multimedia data to the opposition apparatus using at least two strains of transmission lines from among the redundant multiple strain transmission lines when a carrier cannot be detected in the detecting step for all of the redundant multiple strain transmission lines until a corresponding carrier is detected.

In one embodiment, the method further comprises outputting, in a third output step, the packeted multimedia data to a receiving side apparatus using at least two strains of transmission lines from among the redundant multiple strain transmission lines. The step of changing over includes changing over to a selected receiving capable transmission line from among the redundant multiple strain transmission lines based on the carrier detection.

In one embodiment, the method further comprises confirming whether or not the corresponding output packet has looped and returned after the packeted multimedia data is output in the third output step; and outputting, in a fourth output step, the packeted multimedia data to the opposition apparatus using one of the transmission lines from among the redundant multiple strain transmission lines when confirmation is received that the output packet has returned.

In one embodiment, the method further comprises detecting a carrier related to the output packeted multimedia data by an apparatus having receiving capabilities and configured with redundant multiple strain transmission lines between the apparatus having receiving capabilities and the apparatus having send and receive function capabilities; and changing over, by the apparatus having receiving capabilities, to a selected receiving capable transmission line from among the redundant multiple strain transmission lines based on the carrier detection.

In embodiments of the multimedia transmission systems, multimedia apparatuses and transmission line changeover methods, the carrier related to the packeted multimedia data that includes sound and/or video is detected, and it changes over to a transmission line based on that carrier detection. The carrier related to the packeted multimedia data is able to determine the effectiveness of the transmission line quickly, because it is able to detect the carrier prior to the complete receipt of the corresponding packeted multimedia data. From those results, the transmission line changeover time can be shortened. When the transmission line is changed over based on the carrier detection, the transmission line changeover time (on the order of milliseconds) is satisfactory for the time required for that changeover in the multimedia transmission, making the multimedia transmission systems, multimedia apparatuses and transmission line changeover methods effective in the multimedia transmission.

DETAILED DESCRIPTION OF THE CERTAIN EMBODIMENTS

When multimedia data that includes sound and/or video is transmitted to a place that is several hundred meters away, safety and cost become a factor. Therefore, Ethernet may be used frequently. In this case, for the purpose of preventing transmission trouble, it is operated with two or more redundant transmission lines.

Figure 9:
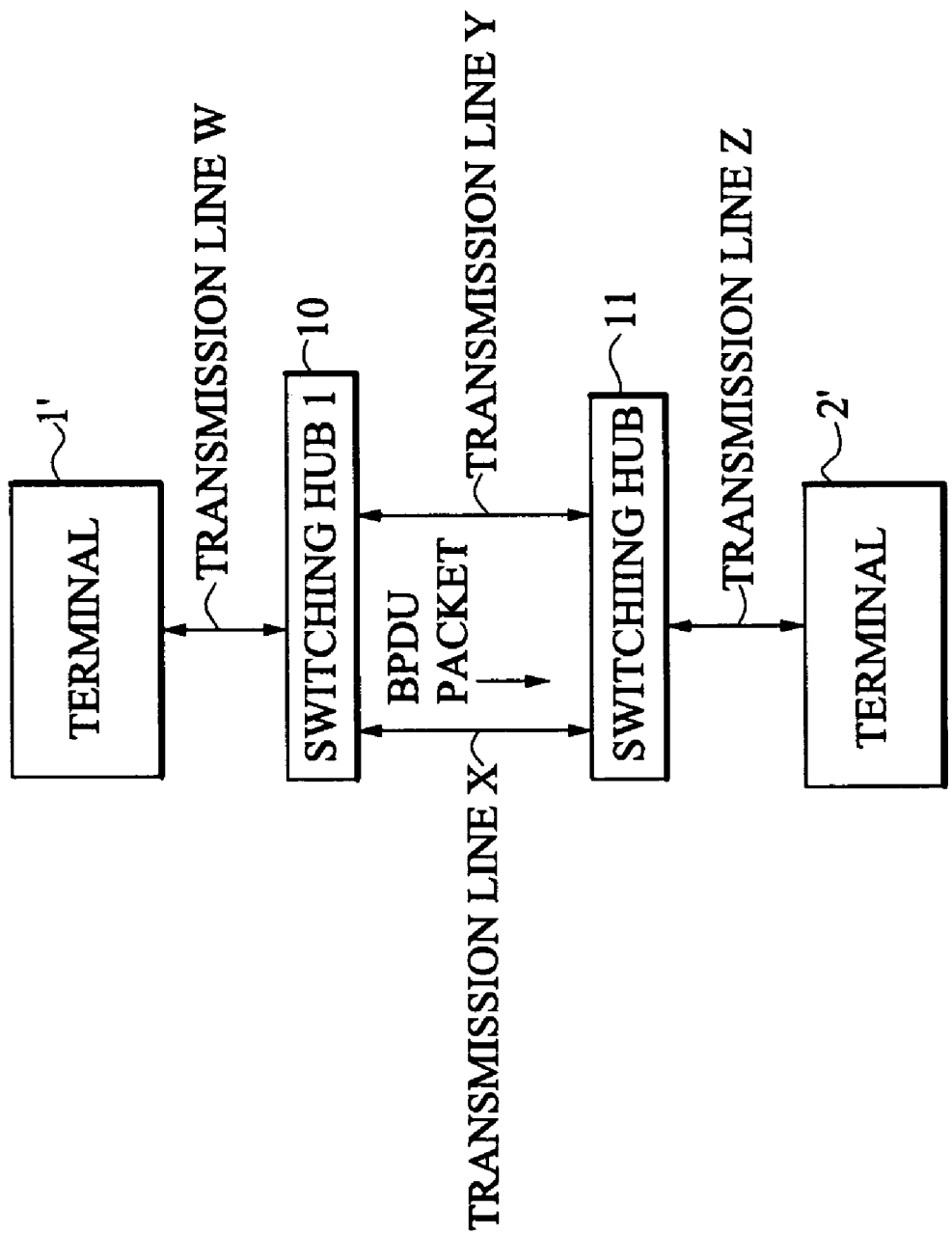
FIG. 9 illustrates the selection of a transmission line from the spanning tree protocol.

For example, in FIG. 9, two strains of transmission line X and transmission line Y are wired between a switching hub 10 and a switching hub 11. The switching hub 10 is connected to a terminal 1' via transmission line W and outputs from the port in response to the input data destination address. The switching hub 11 is connected to a terminal 2' via transmission line Z. According to the hardwiring, the transmission lines between the terminal 1' and the terminal 2' are two redundant strains that are (terminal 1'-transmission line W-switching hub 10-transmission line X→switching hub 11-transmission line Z→terminal 2') and (terminal 1'-transmission line W-switching hub 10-transmission line Y-switching hub 11-transmission line Z-terminal 2').

In general, when more than two strains of redundant transmission lines are transported in a terminal, measures are taken so that a loop packet is not generated on the network. One of those measures, for example, is to have a protocol that avoids the data link layer of the network loop, increasing the utilization of the spanning tree protocol (IEEE 802.1d) or rapid spanning tree protocol (IEEE 802.1w).

For example, in the spanning tree protocol, the root bridge (in FIG. 9, the switching hub 10) is decided according to the conversion of the bridge protocol data unit (BPDU) packet run together in each switch. In the center of the determined root bridge, it is independently configured so that the loop is not generated in a logical route. For example, in the case of the network configuration shown in FIG. 9, from spanning tree protocol, transmission line X is selected, and transmission line Y is blocked so a loop is not generated on the transmission line configured between the terminal 1' and the terminal 2'.

In the Spanning tree protocol, the BPDU packet is sent from the root bridge at a set time interval (e.g., two-second interval), generated defects are found when a down flow switch (in FIG. 9, the switching Hub 11) is not reached, and new route calculations are done. Based on those calculations, it provides a changeover to a new transmission line.

Based on the aforementioned spanning tree protocol or rapid spanning tree protocol reaching the specific packet (or frame), in the method for detecting defects in the transmission line, when the time exceeds the packet sending interval, it leads to the detection of the generation of defects and necessitates a transmission line changeover.

Here, in the multimedia transmission, because the required changeover time may be on the order of milliseconds, when the spanning tree protocol in the multimedia transmission is utilized, a packet-sending interval related to defect detection should use a shorter interval. At the same time, when the packet is sent at a sufficient interval required for changeover time in the multimedia transmission, the packet itself corresponds to a broadband network. Consequently, based on the attainment of the packet, defects may be detected and the transmission line changeover may not be effective for the multimedia transmission.

In order to solve these issues, embodiments of the invention provide multimedia transmission systems, multimedia apparatuses, and changeover methods for the transmission line for the purpose of a multimedia transmission in which the time necessary for fault detection and transmission line changeover may be reduced.

Figure 1:
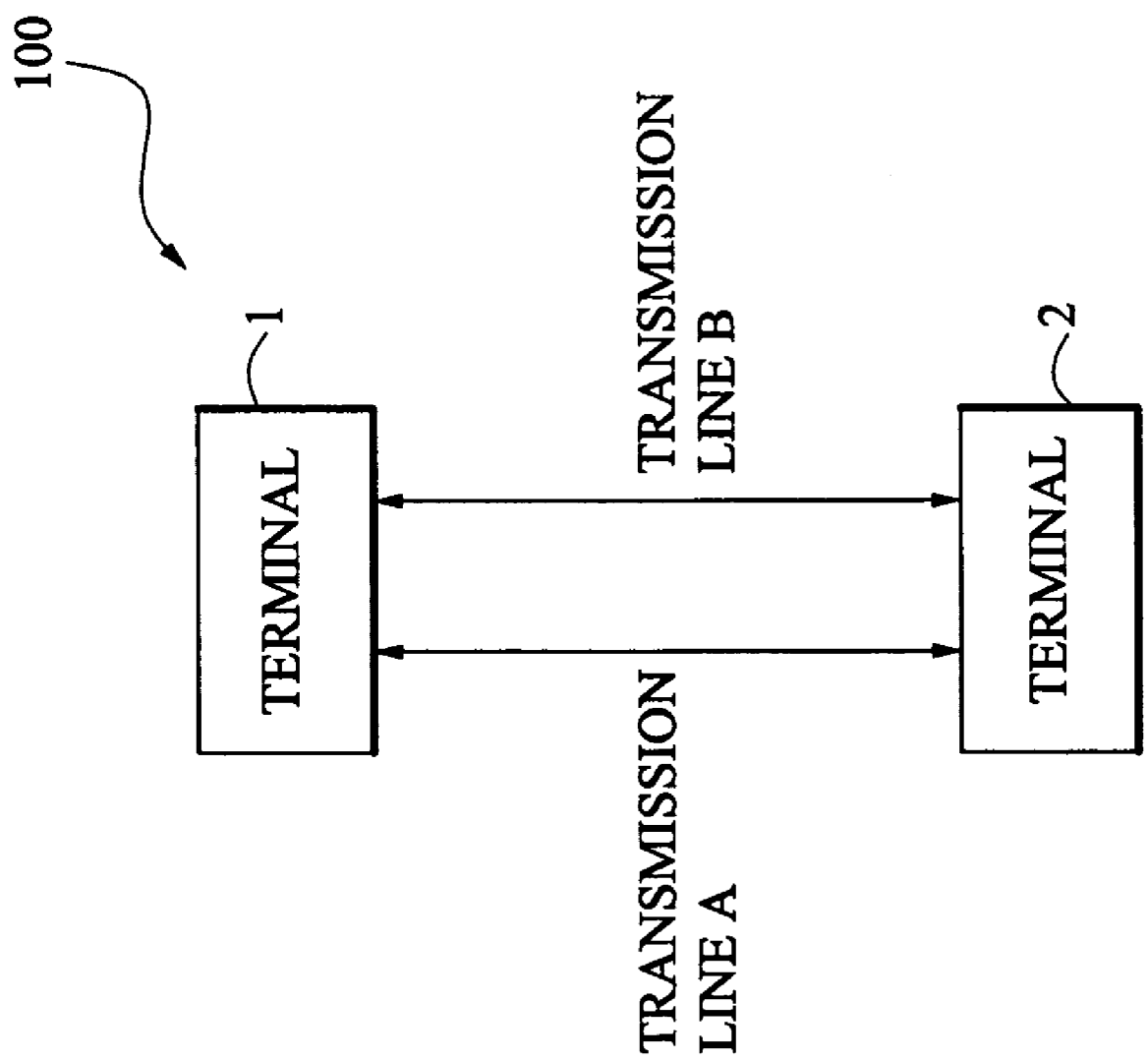
FIG. 1 illustrates a multimedia transmission system according to an embodiment of the invention.

Following are explanations of the attached Figures that illustrate certain embodiments of this invention. FIG. 1 illustrates a multimedia transmission system 100 according to an embodiment of the invention. As shown in FIG. 1, the first embodiment of the multimedia transmission system 100 is configured with a first terminal 1 and a second terminal 2 that each have send and receive function capabilities. The transmission line set between the terminals 1, 2 is configured with various cables (wired) of redundant transmission line A and transmission line B.

Figure 2:
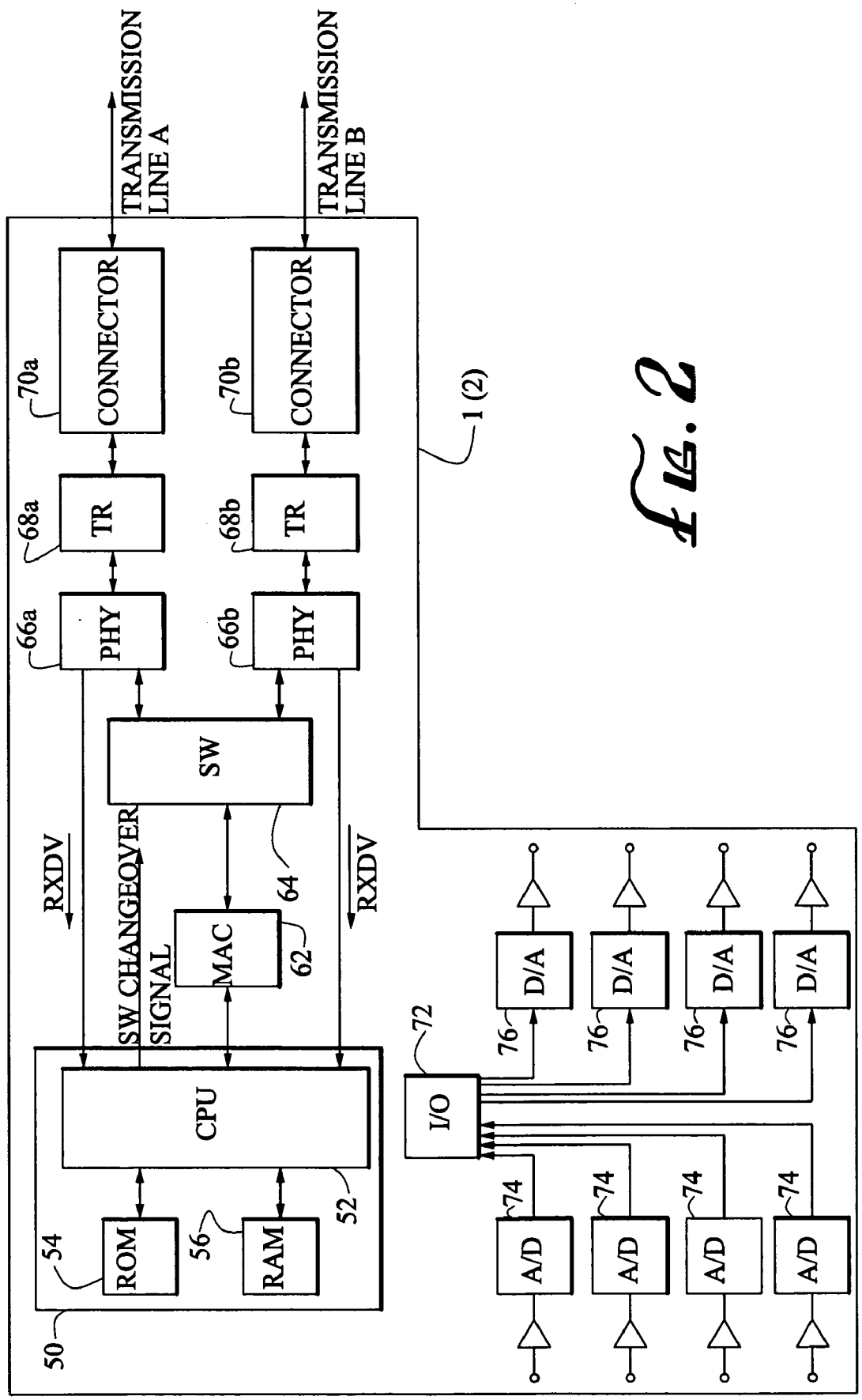
FIG. 2 is a block diagram illustrating an embodiment of a terminal used in the multimedia transmission system of FIG. 1.

Next, with reference to FIG. 2, the configuration of an embodiment of a terminal (such as terminal 1 or terminal 2) used in the multimedia transmission system 100 will be described. FIG. 2 is a block diagram illustrating the configuration of the terminal 1 (and the terminal 2). In the following description, the terminal 1 is used as an example in the explanation; however, terminal 2 may be identical.

As shown in FIG. 2, the terminal 1 is equipped with a controller 50, a media access control (MAC) circuit 62, a switch circuit (SW) 64, two physical layer circuits (PHY) 66*a*, 66*b*, two trance circuits (TR) 68*a*, 68*b*, and two connectors 70*a*, 70*b* for the connection of transmission line A and transmission line B.

The terminal 1 is also equipped with four analog-to-digital converters (A/D) 74 that are connected to each of the input terminals, four digital-to-analog converters (D/A) 76 that are connected to each of the output terminals, and an interface (I/O) 72 that connects the controller 50 (which includes a CPU 52) to the A/Ds 74 and the D/As 76.

The controller 50 is configured with a central processing unit (CPU) 52, a read-only memory (ROM) 54 that stores the control program and fixed value data, and a random access memory (RAM) 56 that enables a working area and temporary area with random access. The controller 50 receives input multimedia data, that may include digital sound, digital video or both, from each A/D 74 via the I/O 72, and outputs the data to the MAC 62. It also converts the MAC frame input from the MAC 62 into the sorted digital data and outputs to each D/A 76 via the I/O 72.

In the controller 50, when an active received-data-valid (RXDV) signal is received from PHY 66*a* or PHY 66*b* within a set timeframe (e.g., 256 μs), it determines that the transmission line that links to the receipt source PHY (66*a* or 66*b*) is a sending and receiving capable transmission line, and that transmission line used for sending and receiving sends the SW changeover signal to the SW 64.

The MAC 62 generates MAC frame packets from the input digital data from the controller 50, and the generated MAC frame is output to the SW 64 at a set timing (e.g., 125 μs). In the alternative, when the MAC frame input from the SW 64 includes an address itself, that MAC frame is received and is output to the CPU 52.

The SW 64 is the circuit for changing over the transmission line when the MAC frame is sent to and received from the opposition terminal (i.e., the terminal 2). In addition, as detailed above, the changeover signal output from the controller 50 changes over in response to the effectiveness of transmission line A and transmission line B. The SW 64 outputs the provided MAC frame from the MAC 62 to the PHY (66*a* and 66*b*) that are connected to the effective transmission line in response to the output changeover signal (SW changeover signal) from the controller 50. Also, the provided decoded MAC frame from the PHY (66*a*, 66*b*) connected to the effective transmission line is output to the MAC 62.

In the PHY 66*a*, 66*b*, after the input MAC frame from the SW 64 is serial-coded, the signal waveform conversion occurs. The various responses to the PHY 66*a*, 66*b* are output to transmission line A and transmission line B. Alternatively, PHY 66*a*, 66*b*, via the connector (70*a*, 70*b*) and TR (68*a*, 68*b*), input the MAC frame from the terminal 2. After being paralleled and coded, it is output to the SW 64.

Here, in the PHY 66*a*, 66*b*, when the carrier (e.g., in the Ethernet frame preamble) related to the MAC frame from the terminal 2 is input, a standardized interface and a Medium Independent Interface (MII) RXDV signal is activated and input to the controller 50. Therefore, in the active RXDV signal input from the PHY 66*a*, 66*b* detected from the controller 50, the controller 50 can detect the arrival of the carrier related to the MAC frame. Because, the detection of that carrier from the controller 56 can detect that carrier prior to the completion of the receipt of the MAC frame, that carrier detection characterizes the use of an effective transmission line changeover.

In the terminal 1 that has this configuration, after the A/D conversion from the A/D 74, multiplexing from the controller 50, and generation of packeted MAC frame from the MAC 62, the input multimedia data that includes sound, video, or both from the input terminal are output to the SW 64 at a set timing (e.g., 125 μs).

The SW 64 sends the MAC frame to the PHY(66*a* or 66*b*) in response to the SW changeover signal from the controller 50; specifically, that is connected to the decided effective transmission line (A or B) according to the controller 50. Consequently, the generated (packeted) MAC frame from the MAC 62 is output to the decided effective transmission line (transmission line A or transmission line B) according to the controller 50 via the TR (68a or 68b) and Connector (70a or 70b) connected to the PHY (66a or 66b).

Specifically, when the MAC frame is input to the PHY 66a, the MAC frame is output to transmission line A via the TR 68a and the connector 70a. Alternatively, when the MAC frame is input to the PHY 66b, the MAC frame is output to transmission line B via the TR 68b and the connector 70b.

Alternatively, when the MAC frame is received from the opposition terminal (e.g., the terminal 2), the SW 64 is sided in response to the SW changeover signal from the controller 50. More specifically, according to the controller 50, the SW 64 provides the input MAC frame from an effective and determined transmission line (A or B) to the MAC 62 via the connector (70a or 70b), the TR (68a or 68b) and the PHY (66a or 66b).

Specifically, when transmission line A is the determined effective transmission line according to the controller 50, the output MAC frame is provided to the MAC 62 from the opposition terminal via the connector 70a, the TR 68a, the PHY 66a and the SW 64. Furthermore, when transmission line B is the determined effective transmission line according to the controller 50, the output MAC frame is provided to the MAC 62 from the opposition terminal via the connector 70b, the TR 68b, the PHY 66b, and the SW 64.

Therefore, in the multimedia transmission system 100 configured from the terminal 1 and the terminal 2 configured as written above, the terminal 1 and the terminal 2 are configured with redundant transmission line A and transmission line B between the terminals 1 and 2. The determined effective transmission line used for each terminal in the controller 50 sends the MAC frame together.

The multimedia transmission system 100 can be configured for appropriate use (for example, a concert hall). Specifically, the terminal 1 may be placed stage side and the terminal 2 may be placed away from the stage in a mixing booth. From the microphone onstage or musical instruments directed to the terminal 1, the input packeted multimedia data (voice data) is transmitted to the terminal 2 and, according to the mixing apparatus connected to the terminal 2, the processed multimedia data packet is transmitted again from the terminal 2 to the terminal 1 and is appropriately able to output from the monitor and/or speakers connected to the terminal 1.

With regard to the terminals 1 and 2 that are utilized in an embodiment of the multimedia transmission system 100, prior to the completion of the receipt of the MAC frame in the MAC 62, an active RXDV signal is output from the PHY (66a or 66b) according to the carrier related to the MAC frame and detected by the controller 50 (or the CPU 52 in the controller 50). Based on that detection, the SW changeover signal is output to the SW 64 and, according to this, is changed over to an effective transmission line.

Figure 3:
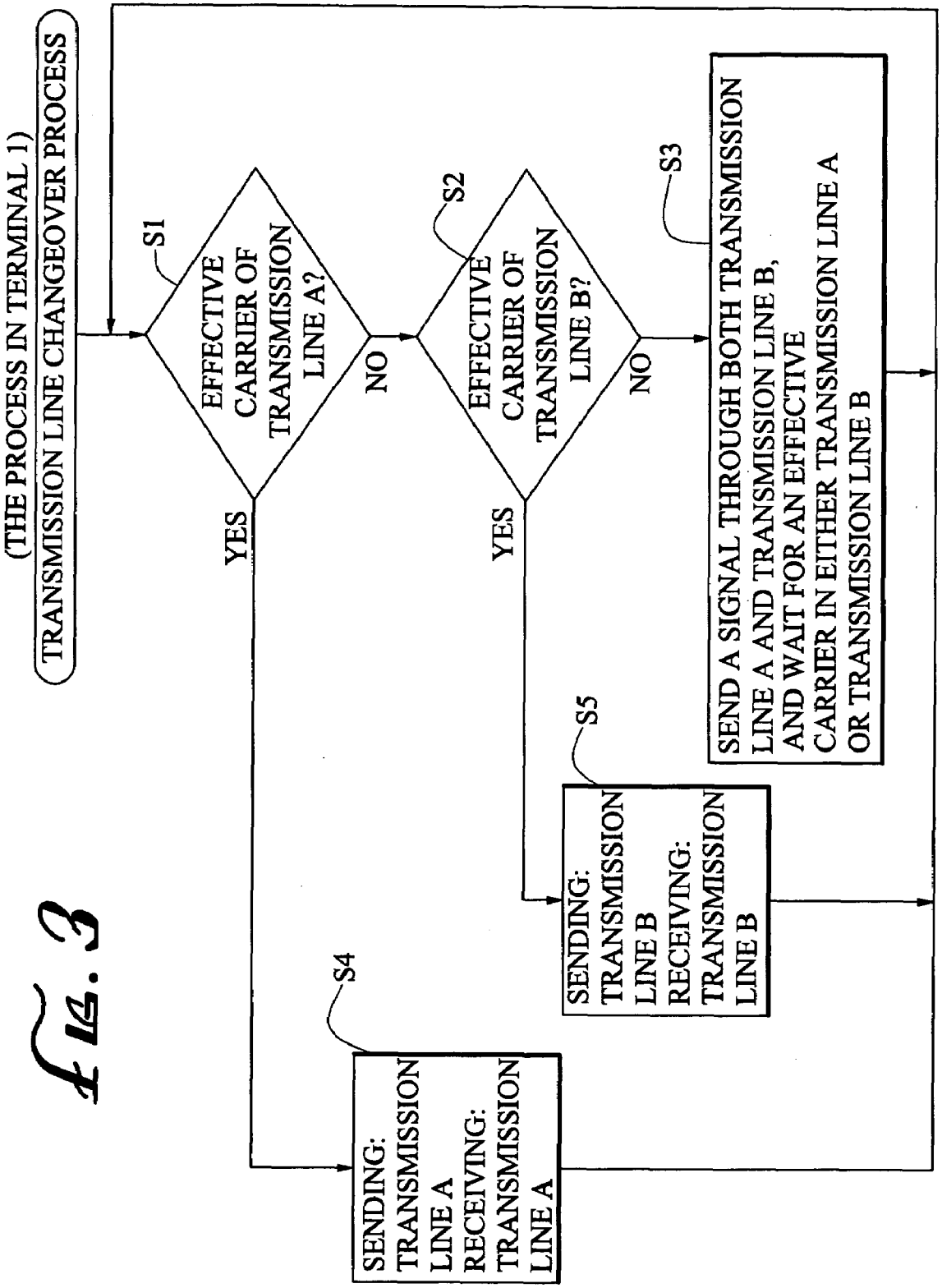
FIG. 3 is a flowchart illustrating an embodiment of a transmission line changeover process in the terminal of FIG. 2.

Here, as shown in FIG. 3, an explanation of an embodiment of a capable transmission line changeover process is described. FIG. 3 is a flowchart illustrating an embodiment of a transmission line changeover process working in the controller 50 (or in the CPU 52) of the terminal 1. This transmission line changeover process moves according to the power source of the terminal 1 and regularly monitors the effectiveness of transmission line A and transmission line B.

First, it is determined whether or not the transmission line A carrier is effective (S1). In this regard, the judgment in the S1 step determines whether the transmission line A carrier is effective or not. For example, the judgment may include "determine whether or not the carrier related to the MAC frame received from the terminal 2 is detected within a set time frame (e.g., 256 µs) when transmission line A is used as the sending and receiving transmission line" or "determine whether or not the carrier related to the MAC frame is detected within a set time frame from the determined and effective transmission line A according to the directly preceding carrier detection."

After the results of the S1 process are confirmed, if the transmission line A carrier is effective (S1: Yes), transmission line A becomes the sending and receiving transmission line, and the changeover signal is output to select transmission line A (S4). The transmission line changeover process then returns to repeat step S1.

On the other hand, after the results of the S1 process are confirmed, if the transmission line A carrier is determined to be not effective (S1: No), it is determined whether or not the transmission line B carrier is effective (S2). The judgment used in the S2 step may be the same as the judgment used in the aforementioned S1 step. The judgment method is either "determine whether or not the carrier related to the MAC frame received from the terminal 2 is detected within a set time frame when transmission line B is used as the sending and receiving transmission line" or "determine whether or not the carrier related to the MAC frame is detected within a set time frame from the determined and effective transmission line B according to the directly preceding carrier detection."

After the results of the S2 step are confirmed, if the transmission line B carrier is effective (S2: Yes), transmission line B becomes the sending and receiving transmission line, and the changeover signal is output to select transmission line B (S5). The transmission line changeover process then returns to repeat step S1.

On the other had, after the results of the S2 step are confirmed, if the transmission line B carrier is not effective (S2: No), the packeted multimedia data is sent simultaneously from both transmission line A and transmission line B, waiting for a carrier transmission line A or transmission line B to become effective (S3). The transmission line changeover process then returns to repeat step S1. Alternatively, when it is confirmed in the S1 and S2 processes that all transmission line carriers (transmission line A and transmission line B) are not effective, until the S1 and S2 processes can confirm that any transmission line carrier becomes effective, in the S3 process, the packeted multimedia data are sent simultaneously through all transmission lines.

Consequently, in the transmission line changeover process operating in the terminal 1, when transmission line A is used as the main transmission line for the packeted multimedia data that includes sound and/or video, when there is a defect in transmission line A, if transmission line B is effective, the transmission line for the packeted multimedia data is changed to transmission line B according to the results of the S5 step. Furthermore, if there is a defect in transmission line B, if transmission line A is effective, it changes the transmission line to transmission line A.

Here, the effectiveness of the transmission line is, as mentioned above, decided according to whether or not an active RXDV signal that is output from the PHY 66a from the carrier related to the MAC frame is detected by the controller 50 (or the CPU52), and that carrier detection is detected prior to the completion of the receipt of the MAC frame. Consequently, in the transmission line changeover process operating in the terminal 1 used in an embodiment of the multimedia transmission system 100, prior to the receipt of the packeted multimedia data, the transmission line changeover process determines the effectiveness of the transmission line and whether or not there are any defects, therefore it is possible to have a faster transmission line changeover than the defects found in the transmission line changeover process based on the arrival of the packet in the transmission line in the spanning tree protocol (etc.). Furthermore, the speed of that changeover time is effective in having a required changeover time on the order of milliseconds in the multimedia transmission.

In addition, in the terminal 2, which may operate the same transmission line changeover process shown in FIG. 3, in response to the effectiveness of transmission line A and transmission line B, the sending and receiving transmission line changes over to transmission line A and transmission line B.

Figure 4:
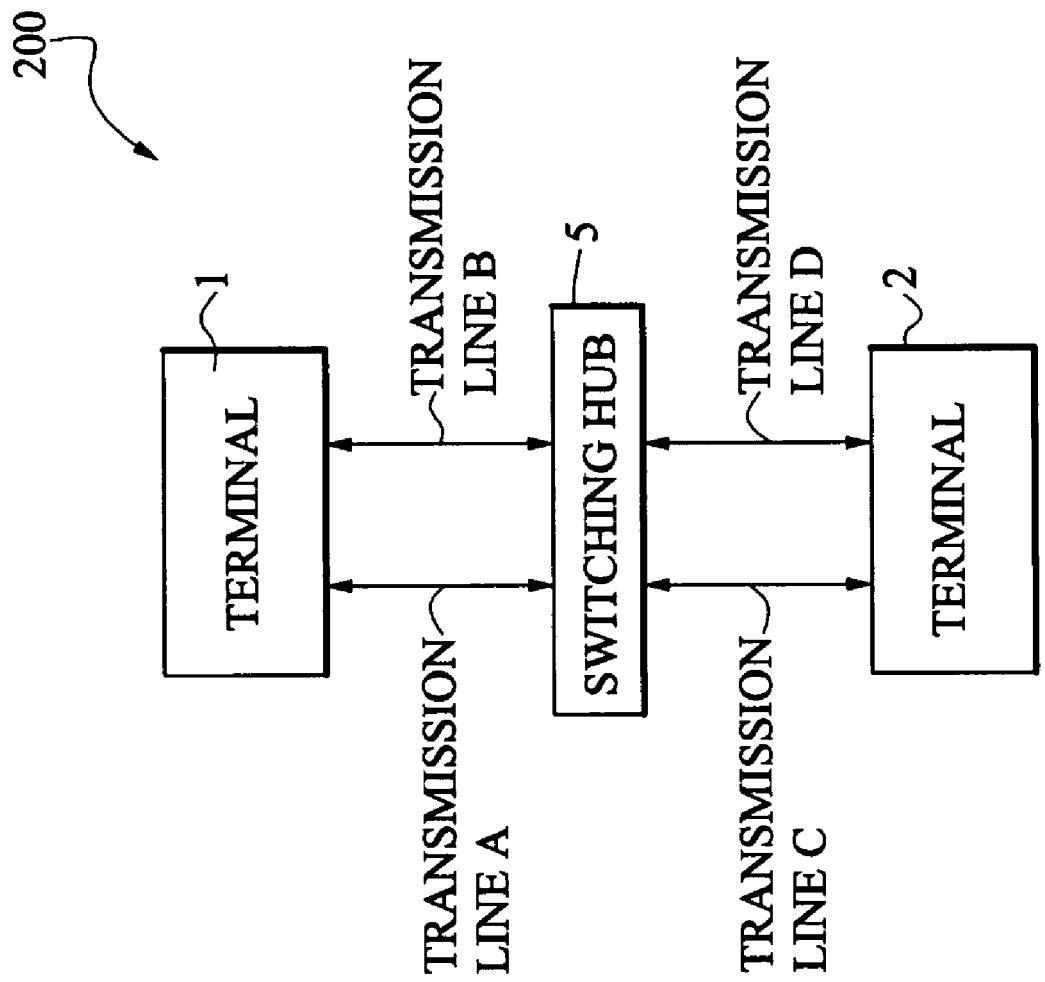
FIG. 4 illustrates a multimedia transmission system according to a second embodiment of the invention.

Next, with reference to FIG. 4, an explanation of another embodiment of a multimedia transmission system is provided. FIG. 4 is a block diagram illustrating an exemplary embodiment of a multimedia transmission system 200. In addition, the same configuration of the terminal 1 and the terminal 2 is used as the one in the aforementioned multimedia transmission system 100 of FIG. 1.

As shown in FIG. 4, an embodiment of multimedia transmission system 200 is configured with a terminal 1 and a terminal 2 that have send and receive function capabilities. Further, it is configured with a switching hub 5 between those the terminals. Transmission line A and transmission line B are configured as various cables (wired) between the terminal 1 and the switching hub 5. Transmission line C and transmission line D are configured as various cables between the terminal 2 and the switching hub 5. Consequently, the transmission line set up is redundant between the terminal 1 and the terminal 2.

In this multimedia transmission system 200, the MAC frame is output from the terminal 1 to transmission line A and transmission line B and transmitted to transmission line C and transmission line D according to the switching hub 5. On the other hand, the terminal 2, via transmission line C and transmission line D, receives the MAC frame from the effective transmission line that is changed over to according to the SW 64 (FIG. 2).

Similarly, in the MAC frame output from the terminal 2 to transmission line C and transmission line D, that MAC frame is transmitted to transmission line A and transmission line B according to the switching hub 5. the terminal 1, via transmission line A and transmission line B, receives the MAC frame from the effective transmission line that is changed over to according to the SW 64.

Similar to the aforementioned multimedia transmission system 100 of FIG. 1, in multimedia transmission system 200, in the terminal 1 and the terminal 2, an effective transmission line changeover process is run prior to the receipt of the MAC frame in the MAC 62, based on carrier detection related to that MAC frame. In other words, for the controller 50 of the terminal 1 and the terminal 2, the transmission line changeover process is run as shown in FIG. 3. In response to the judgment on effective transmission lines, the transmission line changeover process is run. In addition, when the transmission line changeover process in the terminal 2 is run as shown in FIG. 3, it is confirmed whether or not the carriers in transmission line C and transmission line D are effective and in response to the effectiveness of transmission line C and transmission line D, the sending and receiving transmission line is changed over to either transmission line C or transmission line D.

Therefore, the transmission line between the terminal 1 and the terminal 2 that is redundant via the hub 5 in the multimedia transmission system 200 and similar to the aforementioned multimedia transmission system 100 of FIG. 1, because the receiving transmission line changeover is based on the carrier detection of the related packeted multimedia data, it is also possible to increase the effectiveness level of the transmission line changeover in the multimedia transmission when a defect is found in the transmission line.

Figure 5:
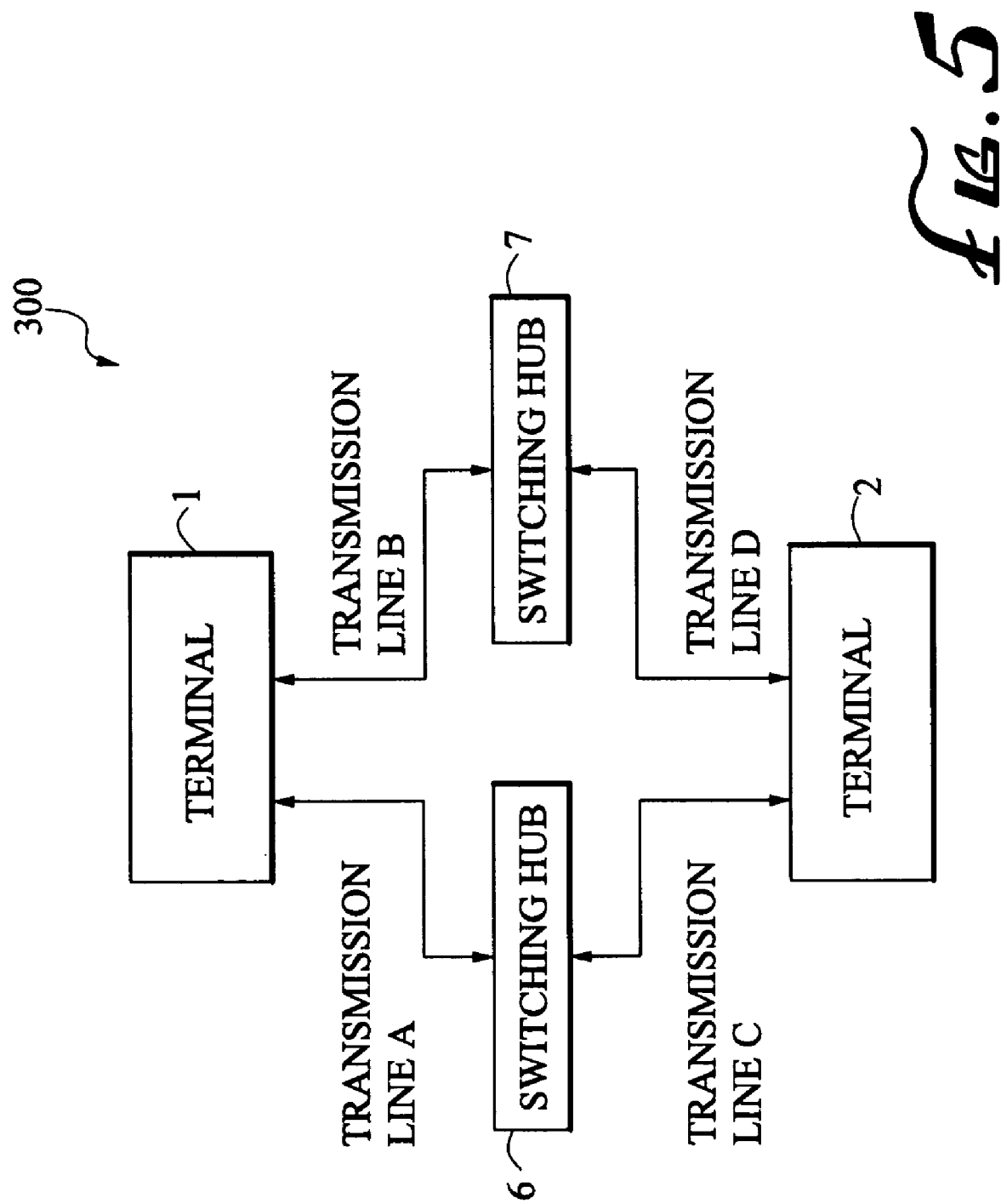
FIG. 5 illustrates a multimedia transmission system according to a third embodiment of the invention.

Next, with reference to FIG. 5, an explanation of another embodiment of a multimedia transmission system is provided. FIG. 5 is a block diagram illustrating another exemplary embodiment of a multimedia transmission system 300. The configuration of the terminal 1 and the terminal 2 is the same as that used in the aforementioned multimedia transmission system 100.

As shown in FIG. 5, in an embodiment of a multimedia transmission system 300, two switching hubs, hub 6 and hub 7, are configured between the terminal 1 and the terminal 2 that have send and receive function capabilities. Transmission line A is configured between the terminal 1 and the switching hub 6, and transmission line C is configured between the switching hub 6 and the terminal 2. Alternatively, transmission line B is configured between the terminal 1 and the switching hub 7, and transmission line D is configured between the switching hub 7 and the terminal 2. Consequently, the transmission line configured between the terminal 1 and the terminal 2 is a transmission line that runs via transmission line A, the switching hub 6, and transmission line C. Another transmission line runs via the transmission line B, the switching hub 7, and transmission line D, and the two strains are redundant.

In this embodiment of the multimedia transmission system 300, because the two strains of transmission lines are run via the switching hubs 6, 7, transmission data is not generated in the loop between the terminal 1 and the terminal 2. Therefore, the terminal 1 can output the packeted multimedia data simultaneously through transmission line A and transmission line B. Alternatively, in the terminal 2, packeted multimedia data can be output simultaneously using both transmission line C and transmission line D. Therefore, in this multimedia transmission system 300, the terminal 1 determines which transmission line from among transmission line A or transmission line B to deliver the packeted multimedia data through according to the carrier detection. Based on that detection, it changes over to the transmission line to be used for receiving. Similarly, the terminal 2 determines which transmission line from among transmission line C or transmission line D to deliver the packeted multimedia data through according to the carrier detection. Based on that detection, it is changed over to the transmission line to be used for receiving.

Figure 6:
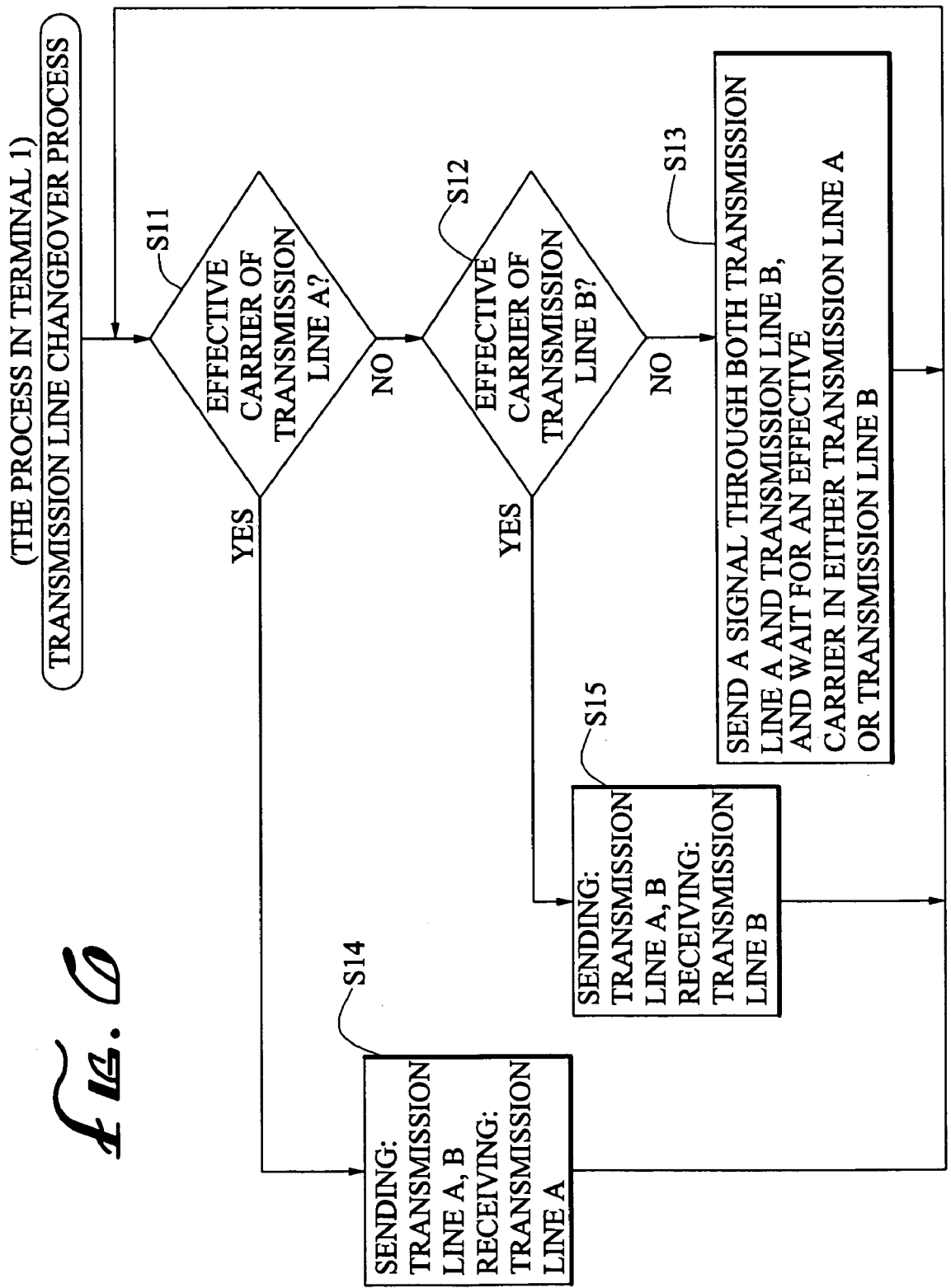
FIG. 6 is a flowchart illustrating an embodiment of the transmission line changeover process in the terminal used in the multimedia transmission system of FIG. 5.

FIG. 6 is a flowchart illustrating an embodiment of a transmission line changeover process in the controller 50 (or in the CPU 52) of the terminal 1 of the multimedia transmission system 300 of FIG. 5. This transmission line changeover process, similar to the transmission line changeover process shown in FIG. 3, is moved to the power source of the terminal 1, regularly monitoring the effectiveness of transmission line A and transmission line B.

First, it is determined whether or not transmission line A carrier is effective (S11). If transmission line A carrier is effective (S11: Yes), both transmission line A and transmission line B are the sending transmission lines, and transmission line A becomes the receiving transmission line, and the SW changeover signal is output to select transmission line A as the receiving transmission line (S14). The transmission line changeover process then returns to repeat step S11.

Alternatively, after the results of the S11 step are confirmed, if the transmission line A carrier is not effective (S11: No), it is determined whether or not the transmission line B carrier is effective (S12). After the results of the S12 step have been confirmed, if the transmission line B carrier is effective (S12: Yes), both transmission line A and transmission line B are the sending transmission lines, and transmission line B becomes the receiving transmission line, and the SW changeover signal is output to select transmission line B as the receiving transmission line (S15). The transmission line changeover process then returns to repeat step S11.

After the results of the S12 step are confirmed, if the transmission line B carrier is not effective (S12: No), the packeted multimedia data is sent from both transmission line A and transmission line B, and the terminal 1 waits for the carrier of either transmission line A or transmission line B to become effective (S13). The transmission line changeover process then returns to repeat step S11.

Additionally, in the terminal 2, the transmission line changeover process is run the same as shown in FIG. 6, and both transmission line C and transmission line D send the MAC frame. Alternatively, the receiving transmission line is changed over in response to the effectiveness of transmission line C and transmission line D.

As stated above, in the third embodiment of the multimedia transmission system 300 of FIG. 5, when the terminal 1 and the terminal 2 output packeted multimedia data that includes sound and/or video, the same packeted multimedia data is output using the two strains of transmission lines. Therefore, if there is a defect on any of the switching hubs 6, 7 on the transmission line, if another transmission line is effective, the opposition terminal can receive the packeted multimedia data. Similarly, if there is a defect in transmission lines A, B, C or D, according to the use of the remaining transmission lines, the packeted multimedia data can be transmitted from one the terminal to another the terminal.

Furthermore, in the third embodiment of the multimedia transmission system 300 of FIG. 5, because the transmission line changeover is based on the carrier detection of the related packeted multimedia data, it is also possible to increase the effectiveness level of the transmission line changeover in the multimedia transmission when a defect is found in a transmission line.

Additionally, the transmission line configuration of the embodiment of the multimedia transmission system of FIG. 4 transmits via a switch hub and two strains of transmission lines. The third embodiment shown in FIG. 5 is configured to transmit via various different switching hubs and two strains of transmission lines. The output packeted multimedia data is output from the terminal 1 and the terminal 2 and can determine whether or not it returns to the terminal. Specifically, when the transmission line configuration of the multimedia transmission system is like the embodiment illustrated in FIG. 4, for example, packeted multimedia data is output in the broadcast to transmission line A of the terminal 1 and that packet is looped to transmission line B. Therefore, it is possible to categorize the transmission line embodiments according to the monitor of the packets after this output.

Consequently, the packet is monitored after output, and, based on those results, a change in the output style of the packet can prevent transmission data loop on the network. For example, when the packeted multimedia data is output from the terminal 1 using transmission line A and transmission line B simultaneously, when that output packet is detected in the terminal 1, from the changeover of the output method for the packeted multimedia data on either transmission line A or transmission line B (specifically, the output of similar packeted multimedia data from the aforementioned embodiment of FIG. 4), transmission data loop on the network can be prevented.

Figure 7:
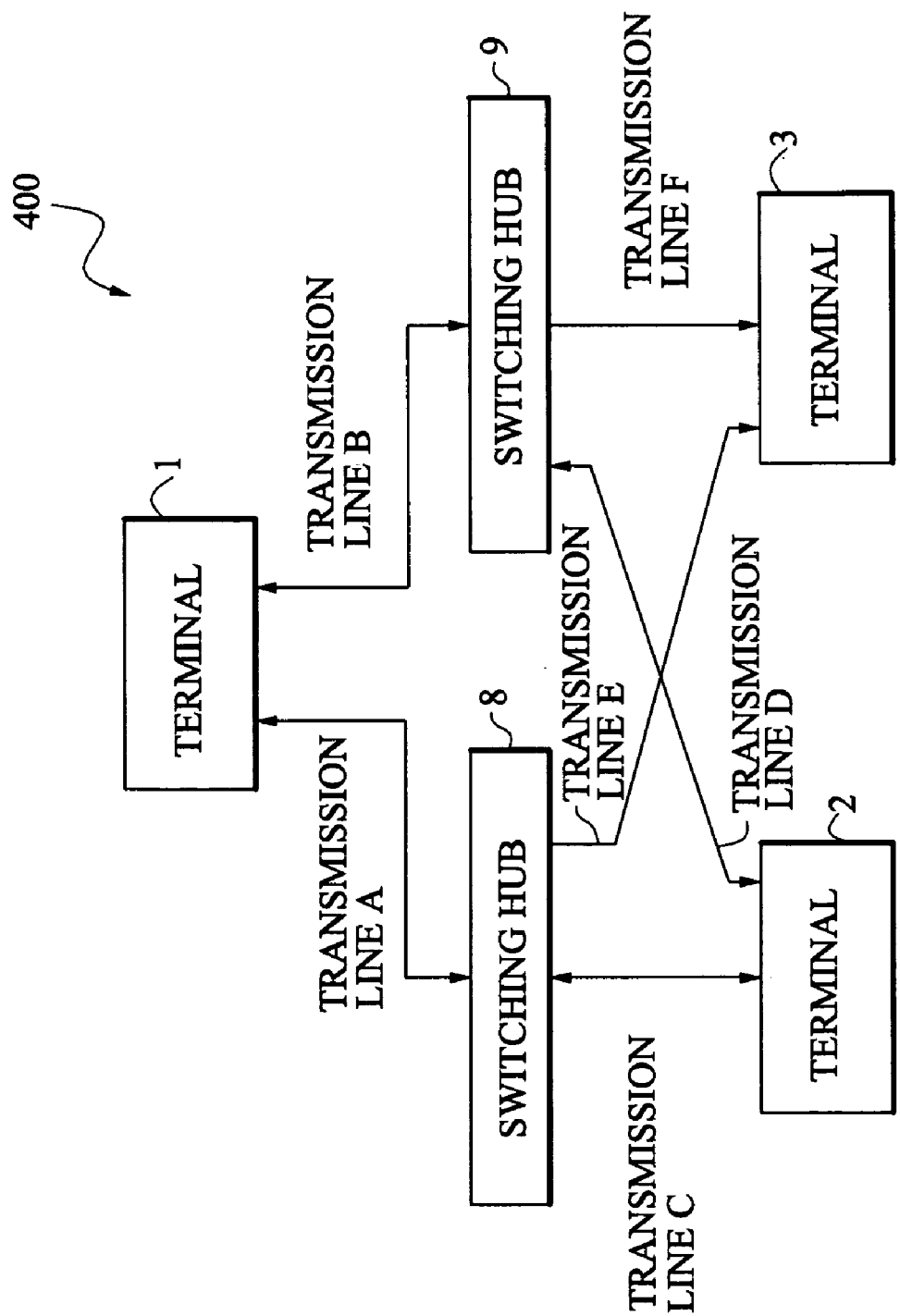
FIG. 7 illustrates a multimedia transmission system according to a fourth embodiment of the invention.

Next, with reference to FIG. 7, an explanation of another embodiment of a multimedia transmission system is provided. FIG. 7 is block diagram illustrating a fourth exemplary embodiment of a multimedia transmission system 400. The configuration of the terminal 1 and the terminal 2 is the same as that used in the multimedia transmission system 100 of FIG. 1. Furthermore, another terminal 3 is a receiving terminal and is configured the same as one without sending capabilities as shown in FIG. 2.

As shown in FIG. 7, the fourth exemplary embodiment of the multimedia transmission system 400 is configured with a terminal 1 and a terminal 2 that have send and receive function capabilities, and a terminal 3 that has receiving capabilities, that are connected via two switching hubs, hub 8 and hub 9.

Transmission line A is configured between the terminal 1 and the switching hub 8, and transmission line C is configured between the switching hub 8 and the terminal 2. Alternatively, transmission line B is configured between the terminal 1 and the switching hub 9, and transmission line D is configured between the switching hub 9 and the terminal 2. Consequently, the transmission line configured between the terminal 1 and the terminal 2 transmits via transmission line A, the switching hub 8, and transmission line C, and also transmits via transmission line B, the switching hub 9, and transmission line D using two redundant transmission line strains.

Transmission line E is the cable configured between the switching hub 8 and the terminal 3, and transmission line F is the cable configured between the switching hub 9 and the terminal 3. Consequently, the transmission line configured between the terminal 1 and the terminal 3 transmits via transmission line A, the switching hub 8, and transmission line E and also transmits via transmission line B, the switching hub 9, and transmission line F using two redundant transmission line strains.

In this embodiment of the multimedia transmission system 400, because the two strains of transmission lines are sent via various switching hubs, hub 8 and hub 9, the terminal 1 in the broadcast can output the packeted multimedia data (multimedia data that includes packeted sound and/or video) through both transmission line A and transmission line B. Here, when the terminal 1 outputs the packeted multimedia data to transmission line A and transmission line B, the packeted multimedia data is transmitted from the switching hub 8 to both transmission line C and E, and it is also transmitted from the switching hub 9 to both transmission line D and F, being received in both the terminal 2 and the terminal 3. Similarly, the terminal 2 can output packeted multimedia data on both transmission line C and transmission line D at the same time.

Accordingly, in this embodiment of the multimedia transmission system 400, the terminal 1 determines which transmission line from among transmission line A and transmission line B delivers the packeted multimedia data through according to the carrier detection. Based on that detection, the transmission line changeover is run for receiving use. Similarly, the terminal 2 determines which transmission line from among transmission line C and transmission line D to receive packeted multimedia data through according to the carrier detection, and the transmission line that is used for reception is changed over based on that detection.

Consequently, in the terminal 1, similar to the transmission line changeover process shown in FIG. 6, the receiving transmission line is changed over according to the effectiveness of transmission line A and transmission line B. Also, in the terminal 2, the receiving transmission line is changed over according to the effectiveness of transmission line C and transmission line D.

In this embodiment of the multimedia transmission system 400, the terminal 3 determines which transmission line from among transmission line E and transmission line F to deliver the packeted multimedia data through according to the carrier detection, and the transmission line that is used for reception is changed over based on that detection.

Figure 8:
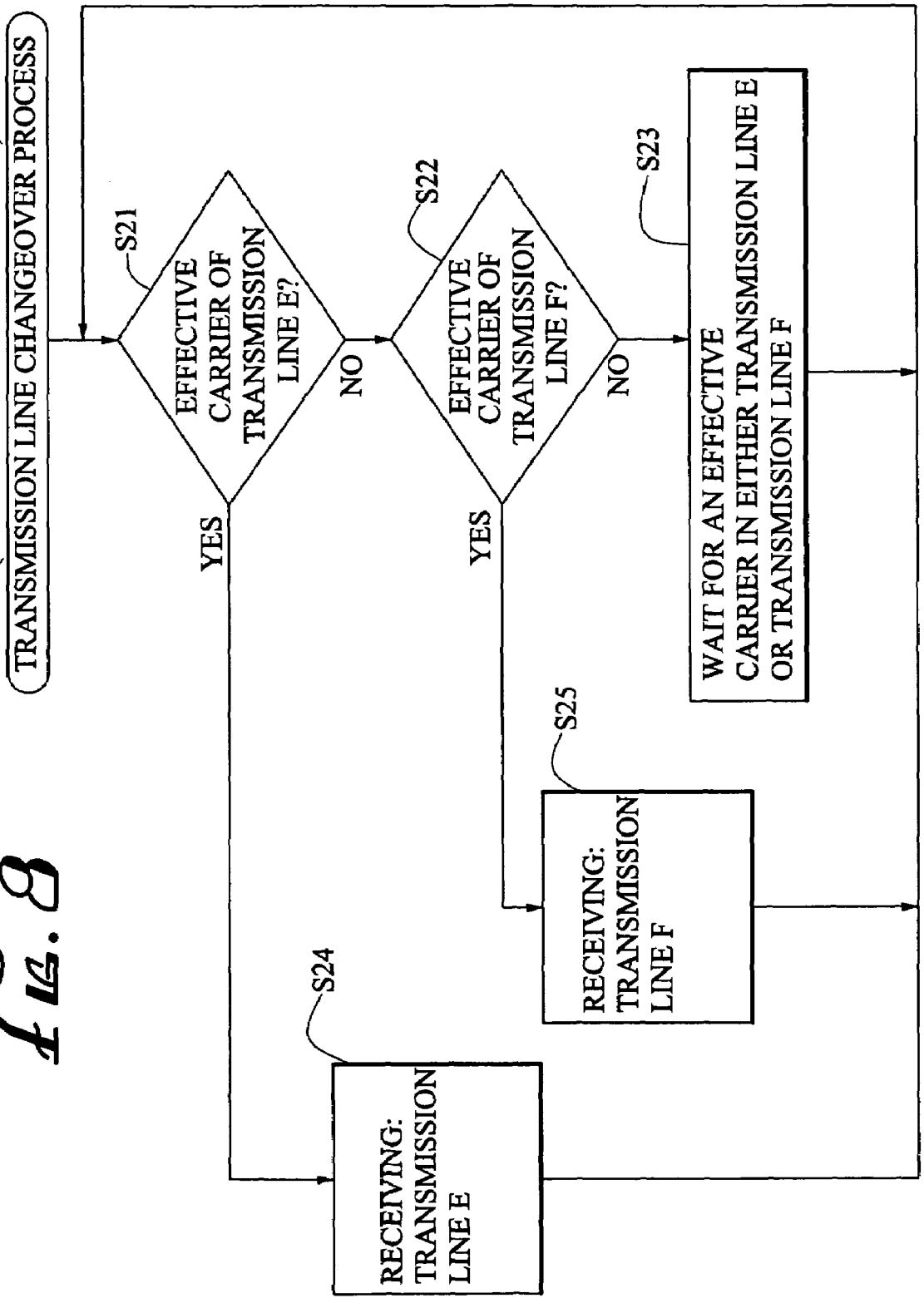
FIG. 8 is a flowchart illustrating an embodiment of the transmission line changeover process in a receive-only terminal used in the multimedia transmission system of FIG. 7.

FIG. 8 is a flowchart that shows an embodiment of a transmission line changeover process in the controller 50 (or in the CPU 52) of the embodiment of the terminal 3 of FIG. 7. The transmission line changeover process in the terminal 3 operates according to the power source to the terminal 3, which regularly monitors the effectiveness of transmission line E and transmission line F.

First, it is decided whether or not the transmission line E carrier is effective (S21). If the transmission line E carrier is effective (S21: Yes), transmission line E becomes the receiving transmission line, and the SW changeover signal is output to select transmission line E as the receiving transmission line (S24). The transmission line changeover process then returns to repeat S21.

Alternatively, after the results from the S21 process are confirmed, if the transmission line E carrier is not effective (S21: No), it is determined whether or not the transmission line F carrier is effective (S22). After the results from the S22 process are confirmed, if the transmission line F carrier is effective (S22: Yes), transmission line F becomes the receiving transmission line, and the SW changeover signal is output to select transmission line F as the receiving transmission line (S25). The transmission line changeover process then returns to repeat S21.

Furthermore, after the results of the S22 process are confirmed, if the transmission line F carrier is not effective (S22: No), it waits for either transmission line E or transmission line F carriers to become effective (S23). The transmission line changeover process then returns to repeat S21.

As described, in the multimedia transmission system 400 of FIG. 7, when the terminal 1 and the terminal 2 output packeted multimedia data that includes sound and/or video, the packeted multimedia data is output using the same two strains of the transmission line. Therefore, if there is a defect on any of the switching hubs (in this embodiment, hub 8 and hub 9) on the transmission lines, it is possible for the opposition terminal to receive packeted multimedia data if another transmission line is effective.

Furthermore, it is possible for the receiving terminal 3 to receive multimedia data according to the remaining transmission lines if one of the transmission lines A, B, E, or F is defective. Similarly, in the terminal 1 and the terminal 2, if there is a defect in any of transmission lines A, B, C or D, it is possible to transmit packeted multimedia data from one terminal to another terminal using the remaining transmission lines.

Furthermore, in this embodiment of the multimedia transmission system 400, because the transmission line changeover is based on the carrier detection of the related packeted multimedia data, it is also possible to increase the effectiveness level of the transmission line changeover in the multimedia transmission when a defect is found in the transmission line.

In addition, the multimedia transmission system 400 uses two switching hubs (hub 8 and hub 9), and it is able to be configured to changeover the transmission line according to one switching hub. Therefore, in the multimedia transmission system 400, a terminal that has send and receive function capabilities and a receiving terminal compose the transmission system. As described above, it monitors the packet after output and, depending on whether the output packet returns, the packet output changes so that it is capable of preventing transmission data loop on the network.

As explained above, in the multimedia transmission systems 100, 200, 300, 400, each terminal 1, 2, 3, together in the transmission line changeover process, the effectiveness of the transmission line is determined based on the carrier detection related to the packeted multimedia data and, when a defect is found, a changeover of the transmission line occurs. Because the carrier related to the packeted multimedia data is able to make a detection prior to the receipt of the corresponding packeted multimedia data, it is able to determine the effectiveness of the transmission line faster. According to those results, it is possible to shorten the time of the transmission line changeover. When the transmission line is changed over based on the carrier detection, the time required for that changeover is what is needed for a satisfactory level of changeover time (a number on the order of milliseconds) in the multimedia transmission line. Consequently, the multimedia transmission system, multimedia apparatus and transmission line changeover method in the multimedia transmission are effective.

Furthermore, according to the monitoring of the multimedia data that has been output, because it is possible to categorize the transmission line embodiment, an output method of the packet in response to the transmission line embodiment is selected. In response to the output method of the selected packet the transmission line changeover process can be run. Consequently, it is possible for a broadcast type redundant transmission lines in the transmission embodiment.

Furthermore, in the multimedia transmission system of this invention, multimedia transmission system 100, 200, 300, 400 having a terminal 1, 2, 3 of the multimedia apparatus, it is possible to control the apparatus cost because a large amount of the upper physical layer is not necessary to make any of the transmission lines redundant.

The example embodiments of this invention are explained; however, the invention is not limited by the aforementioned example embodiments. It is easy to speculate that it is possible for there to be other positive effects which do not depart from the scope of this invention.

For example, in each of the aforementioned embodiments using wired transmission lines, if there are carriers for the packeted multimedia data, the transmission line may use wireless or optical transmission vehicles for each of the aforementioned embodiments and the transmission line changeover can be run quickly.

Also, in some embodiments, when it is confirmed that all transmission line carriers are ineffective, until it is confirmed that any of the carriers on the transmission line are effective, it is configured to send the packeted multimedia data through all transmission lines simultaneously. Changing to this configuration, if it is confirmed that all transmission line carriers are not effective, the packeted multimedia data is sent through both transmission line A and transmission line B, and is configured to wait until an effective carrier can be found in either transmission line A or transmission line B.

Furthermore, in the embodiment of the multimedia transmission system 300 of FIG. 5, it is possible to execute the transmission line changeover process (FIG. 3) running in the terminal 1 (and in the terminal 2).

In addition, in the embodiments of FIGS. 5 and 7, the sending side the terminal is configured to output the packeted multimedia data simultaneously through both redundant two strains of transmission lines. When there are more than three strains of redundant transmission line, it is not configured to output the packeted multimedia data through all transmission lines simultaneously; however a configuration of more than two strains of transmission lines to output the packeted multimedia data simultaneously is fine.

Furthermore, the multimedia transmission system illustrated in FIG. 7 is configured with two sending and receiving capable the terminals (the terminal 1 and the terminal 2), one receiving capable the terminal (the terminal 3); however, it would be easy to convert the configuration of the multimedia transmission system to utilize multiple (two or more) receiving capable the terminals.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. A multimedia transmission system with redundant multiple strain transmission lines for sending or receiving packeted multimedia data that includes sound or video, comprising:
   an apparatus having send and receive function capabilities for sending and receiving packeted multimedia data to or from an opposition apparatus, the apparatus comprising:
      a carrier detection device adapted to detect a first carrier signal or a second carrier signal that are related to the packeted multimedia data;
      a first data control device configured to send or receive the packeted multimedia data to or from the opposition apparatus via a first transmission line of the redundant multiple strain transmission lines, the first data control device configured to send the first carrier signal to the carrier detection device in response to the first data control device receiving data from the opposition apparatus via the first transmission line;
      a second data control device configured to send or receive the packeted multimedia data to or from the opposition apparatus via a second transmission line of the redundant multiple strain transmission lines, the second data control device configured to send the second carrier signal to the carrier detection device in response to the second data control device receiving data from the opposition apparatus via the second transmission line;
      a switch device configured to select between the first transmission line and the second transmission line for sending or receiving the packeted multimedia data to or from the opposition apparatus;
      the switch device configured to select the first transmission line, if the carrier detection device detects the first carrier signal, to allow the first data control device to send or receive the packeted multimedia data to or from the opposition apparatus via the first transmission line;
      the switch device configured to select the second transmission line, if the carrier detection device detects the second carrier signal, to allow the second data control device to send or receive the packeted multimedia data to or from the opposition apparatus via the second transmission line;
      wherein the switch device is configured to select the second transmission line, if the first carrier signal is not detected by the carrier detection device in a set time, to allow the second data control device to send or receive the packeted multimedia data to or from the opposition apparatus via the second transmission line; and
      wherein the switch device is configured to select the first transmission line, if the second carrier signal is not detected by the carrier detection device in the set time, to allow the first data control device to send and/or receive the packeted multimedia data to/from the opposition apparatus via the first transmission line.

2. The system of claim 1, wherein the first data control device and the second data control device are adapted to simultaneously send the packeted multimedia data, via the first transmission line and the second transmission line respectively, to the opposition apparatus when the carrier detection device is unable to detect both the first carrier signal and the second carrier signal during the set time, until at least one of the first carrier signal and the second carrier signal is detected by the carrier detection device.

3. The system of claim 1,
   wherein the first data control device and the second data control device are adapted to simultaneously send the packeted multimedia data, via the first transmission line and the second transmission line respectively, to the opposition apparatus;
   wherein the switch device is configured to select between the first transmission line and the second transmission line for receiving the packeted multimedia data from the opposition apparatus;
   wherein the switch device is configured to select the first transmission line, if the carrier detection device detects the first carrier signal, to allow the first data control device to receive the packeted multimedia data from the opposition apparatus via the first transmission line;
   wherein the switch device is configured to select the second transmission line, if the carrier detection device detects the second carrier signal, to allow the second data control device to receive the packeted multimedia data from the opposition apparatus via the second transmission line; and
   wherein the switch device is configured to select the second transmission line, if the first carrier signal is not detected by the carrier detection device in a set time, to allow the second data control device to receive the packeted multimedia data from the opposition apparatus via the second transmission line.
   wherein the switch device is configured to select the first transmission line, if the second carrier signal is not detected by the carrier detection device in the set time, to allow the first data control device to receive the packeted multimedia data from the opposition apparatus via the first transmission line.

4. The system of claim 3, wherein the apparatus further comprises:
   a loop confirmation device adapted to confirm whether a corresponding output packet has looped and returned after the packeted multimedia data is sent from one of the first data control device and the second data control device;
   the one of the first data control device and the second data control device adapted to send the packeted multimedia data to the opposition apparatus using the corresponding transmission line when the loop confirmation device confirms that the output packet has returned.

5. The system of claim 3, further comprising:
   one or more apparatuses that have receiving capabilities configured with redundant multiple strain transmission lines between the one or more apparatuses that have receiving capabilities and the apparatus that has send and receive function capabilities;
   wherein the apparatus that has receiving capabilities comprises:

a carrier detection device adapted to detect a carrier related to packeted multimedia data in the receipt of the packeted multimedia data; and a switch device adapted to change over to the selected receiving capable transmission line based on the detection of the carrier according to the carrier detection device from among the redundant multiple strain transmission line.

6. An apparatus for use in a multimedia transmission system for sending or receiving packeted multimedia data that includes sound or video, the apparatus having sending and receiving function capabilities for sending and receiving the packeted multimedia data to or from an opposition apparatus via a plurality of transmission lines, the apparatus comprising:

a carrier detection device adapted to detect, in receipt of the packeted multimedia data, a first carrier signal or a second carrier signal that are related to the packeted multimedia data;

a first data control device configured to send or receive the packeted multimedia data to or from the opposition apparatus via a first transmission line of the plurality of transmission lines, the first data control device configured to send the first carrier signal to the carrier detection device in response to the first data control device receiving data from the opposition apparatus via the first transmission line;

a second data control device configured to send or receive the packeted multimedia data to or from the opposition apparatus via a second transmission line of the plurality of transmission lines, the second data control device configured to send the second carrier signal to the carrier detection device in response to the second data control device receiving data from the opposition apparatus via the second transmission line;

a switch device configured to select between the first transmission line and the second transmission line for sending or receiving the packeted multimedia data to or from the opposition apparatus;

the switch device configured to select the first transmission line, if the carrier detection device detects the first carrier signal, to allow the first data control device to send or receive the packeted multimedia data to or from the opposition apparatus via the first transmission line;

the switch device configured to select the second transmission line, if the carrier detection device detects the second carrier signal, to allow the second data control device to send and/or receive the packeted multimedia data to or from the opposition apparatus via the second transmission line;

wherein the switch device is configured to select the second transmission line, if the first carrier signal is not detected by the carrier detection device in a set time, to allow the second data control device to send or receive the packeted multimedia data to or from the opposition apparatus via the second transmission line; and wherein the switch device is configured to select the first transmission line, if the second carrier signal is not detected by the carrier detection device in the set time, to allow the first data control device to send or receive the packeted multimedia data to or from the opposition apparatus via the first transmission line.

7. The apparatus of claim 6, wherein the first data control device and the second data control device are adapted to simultaneously send the packeted multimedia data, via the first transmission line and the second transmission line respectively, to the opposition apparatus when the carrier detection device is unable to detect both the first carrier signal and the second carrier signal during the set time, until at least one of the first carrier signal and the second carrier signal is detected by the carrier detection device.

8. The apparatus of claim 6, wherein the first data control device and the second data control device are adapted to simultaneously send the packeted multimedia data, via the first transmission line and the second transmission line respectively, to the opposition apparatus;

wherein the switch device is configured to select between the first transmission line and the second transmission line for receiving the packeted multimedia data from the opposition apparatus;

wherein the switch device is configured to select the first transmission line, if the carrier detection device detects the first carrier signal, to allow the first data control device to receive the packeted multimedia data from the opposition apparatus via the first transmission line;

wherein the switch device is configured to select the second transmission line, if the carrier detection device detects the second carrier signal, to allow the second data control device to receive the packeted multimedia data from the opposition apparatus via the second transmission line;

wherein the switch device is configured to select the second transmission line, if the first carrier signal is not detected by the carrier detection device in a set time, to allow the second data control device to receive the packeted multimedia data from the opposition apparatus via the second transmission line; and wherein the switch device is configured to select the first transmission line, if the second carrier signal is not detected by the carrier detection device in the set time, to allow the first data control device to receive the packeted multimedia data from the opposition apparatus via the first transmission line.

9. The apparatus of claim 8, further comprising:

a loop confirmation device adapted to confirm whether a corresponding output packet has looped and returned after the packeted multimedia data is sent from one of the first data control device and the second data control device;

the one of the first data control device and the second data control device adapted to send the packeted multimedia data to the opposition apparatus using the corresponding transmission line when the loop confirmation device confirms that the output packet has returned.

10. A multiple strain transmission changeover method, comprising:

sending packeted multimedia data that includes sound or video in a multimedia transmission system having multiple transmission lines including a first transmission line and a second transmission line;

detecting a first carrier signal or a second carrier signal that are related to the packeted multimedia data in receipt of the packeted multimedia data by an apparatus having send and receive function capabilities for sending and receiving packeted multimedia data to or from an opposition apparatus;

providing the first carrier signal upon the apparatus receiving the packeted multimedia data via the first transmission line, or providing the second carrier signal upon the apparatus receiving the packeted multimedia data via the second transmission line;

selecting, in a first selection step, the first transmission line, from among the multiple transmission lines, in response to detecting the first carrier signal, or selecting, in the second selection step, a second transmission line, from among the multiple transmission lines, in response to detecting the second carrier signal;

outputting, in a first output step, the packeted multimedia data to the opposition apparatus using the first transmission line, upon detecting the first carrier signal, or outputting, in a second output step, the packeted multimedia data to the opposition apparatus using the second transmission line, upon detecting the second carrier signal;

wherein the second transmission line is selected, if the first carrier signal is not detected in a set time, to output the packeted multimedia data via the second transmission line; and wherein the first transmission line is selected, if the second carrier signal is not detected in the set time, to output the packeted multimedia data via the first transmission line.

11. The method of claim 10, further comprising:
outputting, in a third output step, the packeted multimedia data to the opposition apparatus using at least the first transmission line and the second transmission from among the multiple transmission lines when a carrier cannot be detected during the set time in the detecting step for all of the multiple transmission lines, until a corresponding carrier is detected.

12. The method of claim 10, further comprising:
outputting, in a third output step, the packeted multimedia data to a receiving side apparatus using at least the first transmission line and the second transmission line from among the multiple transmission lines.

13. The method of claim 12, further comprising:
confirming whether or not a corresponding output packet has looped and returned after the packeted multimedia data is output in the third output step; and
outputting, in a fourth output step, the packeted multimedia data to the opposition apparatus using one of the transmission lines from among the multiple transmission lines when confirmation is received that the output packet has returned.

14. The method of claim 12, further comprising:
detecting a carrier related to the output packeted multimedia data by an apparatus having receiving capabilities and configured with multiple transmission lines between the apparatus having receiving capabilities and the apparatus having send and receive function capabilities; and
changing over, by the apparatus having receiving capabilities, to a selected receiving capable transmission line from among the multiple transmission lines based on the carrier detection.

15. A multimedia transmission system, comprising:
a first terminal and a second terminal adapted to send and receive multimedia data;
at least two transmission lines for sending and receiving packeted multimedia data to and from the first terminal and the second terminal;
wherein the first terminal comprises:
a carrier detection device adapted to detect a first carrier signal or a second carrier signal that are related to the packeted multimedia data;
a first data control device configured to send or receive the packeted multimedia data to or from the second terminal via a first transmission line of the at least two transmission lines, the first data control device configured to send the first carrier signal to the carrier detection device in response to the first data control device receiving data from the second terminal via the first transmission line;
a second data control device configured to send or receive the packeted multimedia data to or from the second terminal via a second transmission line of the at least two transmission lines, the second data control device configured to send the second carrier signal to the carrier detection device in response to the second data control device receiving data from the second terminal via the second transmission line;
a switch device configured to select between the first transmission line and the second transmission line for sending or receiving the packeted multimedia data to or from the second terminal;
the switch device configured to select the first transmission line, if the carrier detection device detects the first carrier signal, to allow the first data control device to send or receive the packeted multimedia data to or from the second terminal via the first transmission line;
the switch device configured to select the second transmission line, if the carrier detection device detects the second carrier signal, to allow the second data control device to send or receive the packeted multimedia data to or from the second terminal via the second transmission line;
wherein the switch device is configured to select the second transmission line, if the first carrier signal is not detected by the carrier detection device in a set time, to allow the second data control device to send or receive the packeted multimedia data to or from the second terminal via the second transmission line; and
wherein the switch device is configured to select the first transmission line, if the second carrier signal is not detected by the carrier detection device in the set time, to allow the first data control device to receive the packeted multimedia data from the second terminal via the first transmission line wherein the second terminal comprises:
a carrier detection device adapted to detect a carrier related to the packeted multimedia data; and
a switch device adapted to change over to a selected transmission line of the at least two transmission lines based on the detection of a carrier by the carrier detection device of the second terminal.

16. The multimedia transmission system of claim 15, further comprising:
at least one switching hub positioned between the first terminal and the second terminal, the at least two transmission lines connecting the first terminal to the switching hub; and
at least two transmission lines connecting the switching hub to the second terminal;
wherein the switching hub is adapted to direct the packet multimedia data along the transmission lines selected by the first terminal, the second terminal, or both terminals.

17. The system of claim 1, wherein only one of the first data control device and the second data control device sends the packeted multimedia data to the opposition apparatus at a time.

18. The system of claim 1,
wherein the first data control device is adapted to generate and send the first carrier signal to the carrier detection device in response to the apparatus receiving a portion of the packeted multimedia data from the opposition apparatus via the first transmission line; and wherein the second data control device is adapted to generate and send the second carrier signal to the carrier detection device in response to the apparatus receiving a portion of the packeted multimedia data from the opposition apparatus via the second transmission line.

19. The system of claim 18, wherein the first data control device is adapted to generate and send the first carrier signal to the carrier detection device only when the apparatus receives a portion of the packeted multimedia data from the opposition apparatus via the first transmission line; and wherein the second data control device is adapted to generate and send the second carrier signal to the carrier detection device only when the apparatus receives a portion of the packeted multimedia data from the opposition apparatus via the second transmission line.

20. The system of claim 1, wherein the data received by one of the first control device and the second control device from the opposition apparatus comprises the packeted multimedia data.

21. The system of claim 1, wherein the packeted multimedia data and the carrier signals do not include address information relating to any of the apparatus and the opposition apparatus.

22. The system of claim 1, the carrier detection device configured to send and receive the packed multimedia data to or from one or more of the first data control device and the second data control device;

wherein the first data control device sends the first carrier signal to the carrier detection device on a separate transmission line from the first transmission line for sending and receiving the packeted multimedia data; and wherein the second data control device sends the second carrier signal to the carrier detection device on a separate transmission line from the second transmission line for sending and receiving the packeted multimedia data.

* * * * *